United States Patent
Otaka et al.

(10) Patent No.: US 11,470,463 B2
(45) Date of Patent: Oct. 11, 2022

(54) VEHICLE CONTROL APPARATUS, VEHICLE RECORDING MEDIUM, AND VEHICLE CONTROL METHOD

(71) Applicant: HONDA MOTOR CO., LTD., Tokyo (JP)

(72) Inventors: Masaru Otaka, Wako (JP); Ryusuke Tamanaha, Wako (JP); Shohei Tsukahara, Wako (JP); Ryo Saiki, Wako (JP); Takahiro Iijima, Tokyo (JP); Yusuke Oi, Tokyo (JP); Naoko Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/221,934

(22) Filed: Apr. 5, 2021

(65) Prior Publication Data
US 2021/0321242 A1  Oct. 14, 2021

(30) Foreign Application Priority Data
Apr. 13, 2020  (JP) .............................. JP2020-071447

(51) Int. Cl.
*H04W 8/00* (2009.01)
*H04L 67/06* (2022.01)
*H04W 4/46* (2018.01)
*H04W 76/30* (2018.01)

(52) U.S. Cl.
CPC ............. *H04W 8/005* (2013.01); *H04L 67/06* (2013.01); *H04W 4/46* (2018.02); *H04W 76/30* (2018.02)

(58) Field of Classification Search
CPC ....... H04W 8/005; H04W 4/46; H04W 76/30; H04L 67/06
USPC .......................................................... 455/500
See application file for complete search history.

(56) References Cited

U.S. PATENT DOCUMENTS

| 2015/0193335 A1* | 7/2015 | Woo ...................... G06F 9/5016 711/171 |
| 2020/0228950 A1* | 7/2020 | Clark ...................... H04W 4/46 |

FOREIGN PATENT DOCUMENTS

JP  2017-528085  9/2017

* cited by examiner

*Primary Examiner* — Eugene Yun
(74) *Attorney, Agent, or Firm* — Rankin, Hill & Clark LLP

(57) ABSTRACT

A vehicle control apparatus includes a processor executing a communication control process of performing vehicle-to-vehicle communication, a data reception process of receiving and saving, in a storage unit, file data transmitted from a communication destination vehicle by the vehicle-to-vehicle communication, and an incompletely received file data management process of, in a case where the vehicle-to-vehicle communication is disconnected after reception of the file data by the data reception process is started and before the reception of the file data completes, setting, in accordance with a state of a predetermined parameter, at least one of an upper limit of a period for saving in the storage unit and a priority level for deleting from the storage unit for partial data of the file data saved in the storage unit.

4 Claims, 5 Drawing Sheets

FIG.5

| PARAMETER *ALONE OR IN COMBINATION | UPPER LIMIT OF SAVING PERIOD | DELETION PRIORITY LEVEL |
|---|---|---|
| THROUGHPUT BEFORE DISCONNECTION OF COMMUNICATION | HIGH ⇒ LONG PERIOD<br>LOW ⇒ SHORT PERIOD | HIGH ⇒ LOW PRIORITY LEVEL<br>LOW ⇒ HIGH PRIORITY LEVEL |
| LATENCY BEFORE DISCONNECTION OF COMMUNICATION | LONG ⇒ SHORT PERIOD<br>SHORT ⇒ LONG PERIOD | LONG ⇒ HIGH PRIORITY LEVEL<br>SHORT ⇒ LOW PRIORITY LEVEL |
| PACKET LOSS RATE BEFORE DISCONNECTION OF COMMUNICATION | HIGH ⇒ SHORT PERIOD<br>LOW ⇒ LONG PERIOD | HIGH ⇒ HIGH PRIORITY LEVEL<br>LOW ⇒ LOW PRIORITY LEVEL |
| RSSI BEFORE DISCONNECTION OF COMMUNICATION | STRONG ⇒ LONG PERIOD<br>WEAK ⇒ SHORT PERIOD | STRONG ⇒ LOW PRIORITY LEVEL<br>WEAK ⇒ HIGH PRIORITY LEVEL |
| REMAINING AMOUNT OF UNRECEIVED DATA OF FILE DATA | LARGE ⇒ SHORT PERIOD<br>SMALL ⇒ LONG PERIOD | LARGE ⇒ HIGH PRIORITY LEVEL<br>SMALL ⇒ LOW PRIORITY LEVEL |
| VEHICLE SPEED (THE VEHICLE/THE OTHER VEHICLE) | HIGH ⇒ SHORT PERIOD<br>LOW ⇒ LONG PERIOD | HIGH ⇒ HIGH PRIORITY LEVEL<br>LOW ⇒ LOW PRIORITY LEVEL |
| AVAILABLE SPACE OF MEMORY | LARGE ⇒ LONG PERIOD<br>SMALL ⇒ SHORT PERIOD | LARGE ⇒ LOW PRIORITY LEVEL<br>SMALL ⇒ HIGH PRIORITY LEVEL |
| PATH MATCHING RATE | HIGH ⇒ LONG PERIOD<br>LOW ⇒ SHORT PERIOD | HIGH ⇒ LOW PRIORITY LEVEL<br>LOW ⇒ HIGH PRIORITY LEVEL |
| USAGE RATE OF THE OTHER VEHICLE | HIGH ⇒ LONG PERIOD<br>LOW ⇒ SHORT PERIOD | HIGH ⇒ LOW PRIORITY LEVEL<br>LOW ⇒ HIGH PRIORITY LEVEL |
| RECEIVED POSITION | INSIDE OF LIVING AREA ⇒ LONG PERIOD<br>OUTSIDE OF LIVING AREA ⇒ SHORT PERIOD | INSIDE OF LIVING AREA ⇒ LOW PRIORITY LEVEL<br>OUTSIDE OF LIVING AREA ⇒ HIGH PRIORITY LEVEL |

VEHICLE CONTROL APPARATUS, VEHICLE RECORDING MEDIUM, AND VEHICLE CONTROL METHOD

INCORPORATION BY REFERENCE

The present application claims priority under 35 U.S.C. § 119 to Japanese Patent Application No. 2020-071447 filed on Apr. 13, 2020. The content of the application is incorporated herein by reference in its entirety.

BACKGROUND OF THE INVENTION

Field of the Invention

The present invention relates to a vehicle control apparatus, a vehicle, a recording medium, and a vehicle control method.

Description of the Related Art

Conventionally, a wireless communication method has been proposed which, in each vehicle within a vehicular communication network, determines whether to continuously store in a memory or delete a received data packet based on a ratio of a distance between the vehicle and a destination of the data packet and a distance between a source of the data packet and the destination of the data packet or an expiration time given to the data packet (see Japanese Patent Laid-Open No. 2017-528085, for example).

While a vehicle is receiving a data file by vehicle-to-vehicle communication, there may be a case where the vehicle-to-vehicle communication is disconnected. In this case, since the incomplete data file that is received partially is not usable, it is not desirable to relay the data file to another vehicle and to upload the data file to a network. Accordingly, in order to address such an issue, two methods may be considered including a method (1) including saving the data that is received partially, waiting for recovery of the connection of the vehicle-to-vehicle communication and receiving the remaining data and a method (2) including deleting the data that is received partially to avoid tightness of memory. However, even when either one of the methods is used, there are disadvantages as follows.

According to the method (1), during a period before the connection recovers, the available space of memory may be tightened by data that is received partially and saved in memory, and other data cannot be obtained. Also, there may be a case where the communication partner vehicle is not found, and, in this case, even when an expiration time is set, the state that the remaining space of memory is tightened continues until the expiration time passes.

According to the method (2), since the partially received data is deleted, the data must be transmitted/received from the beginning again when the communication connection recovers, which wastes the vehicle-to-vehicle communication performed before the disconnection and requires long time to complete the data transmission/reception.

The present invention has been made in view of such a background, and it is an object of the present invention to provide a vehicle control apparatus, a vehicle, a recording medium, and a vehicle control method which can address disconnection of vehicle-to-vehicle communication partway through reception of file data by suppressing tightness of the remaining space of memory and promoting increased efficiency of communication.

SUMMARY OF THE INVENTION

As a first aspect for achieving the object, there is provided a vehicle control apparatus mounted in a control target vehicle, the vehicle control apparatus including a processor executing a communication control process of performing vehicle-to-vehicle communication with a communication destination vehicle other than the control target vehicle, a data reception process of receiving and saving, in a storage unit, file data transmitted from the communication destination vehicle by the vehicle-to-vehicle communication, and an incompletely received file data management process of, in a case where the vehicle-to-vehicle communication is disconnected after the vehicle-to-vehicle communication is established and reception of the file data by the data reception process is started and before the reception of the file data completes, setting, in accordance with a state of a predetermined parameter, at least one of an upper limit of a period for saving in the storage unit and a priority level for deleting from the storage unit for partial data of the file data saved in the storage unit.

In the vehicle control apparatus, in the incompletely received file data management process, the processor may use, as the predetermined parameter, at least one of a throughput, received signal strength indication (RSSI), latency, and a packet loss rate when the vehicle-to-vehicle communication is established, a remaining amount of unreceived data of the file data, a speed of the control target vehicle, an available space of the storage unit, matching information of driving paths of the control target vehicle and the communication destination vehicle, a usage rate of the communication destination vehicle, and a current position of the control target vehicle.

In the vehicle control apparatus, in the incompletely received file data management process, the processor may use, as the predetermined parameter, a change rate of at least one of the throughput, RSSI, latency and packet loss rate when the vehicle-to-vehicle communication is established.

In the vehicle control apparatus, in the incompletely received file data management process, the processor may set at least one of the upper limit of the period for saving in the storage unit and the priority level for deleting from the storage unit if the storage unit has an available space equal to or lower than a predetermined space.

As a second aspect for achieving the object, there is provided a vehicle including the vehicle control apparatus.

As a third aspect for achieving the object, there is provided a non-transitory recording medium recording a program for vehicle control causing a processor mounted in a control target vehicle to execute a communication control process of performing vehicle-to-vehicle communication with a communication destination vehicle other than the control target vehicle, a data reception process of receiving and saving, in a storage unit, file data transmitted from the communication destination vehicle by the vehicle-to-vehicle communication, and an incompletely received file data management process of, in a case where the vehicle-to-vehicle communication is disconnected after the vehicle-to-vehicle communication is established and reception of the file data by the data reception process is started and before the reception of the file data completes, setting, in accordance with a state of a predetermined parameter, at least one of an upper limit of a period for saving in the storage unit and a priority level for deleting from the storage unit for partial data of the file data saved in the storage unit.

As a fourth aspect for achieving the object, there is provided a vehicle control method to be executed by a computer for controlling a control target vehicle, the computer performing vehicle-to-vehicle communication with a communication destination vehicle other than the control target vehicle, receiving and saving, in a storage unit, file data transmitted from the communication destination vehicle by the vehicle-to-vehicle communication, and in a case where the vehicle-to-vehicle communication is disconnected after the vehicle-to-vehicle communication is established and reception of the file data transmitted from the communication destination vehicle is started and before the reception of the file data completes, setting, in accordance with a state of a predetermined parameter, at least one of an upper limit of a period for saving in the storage unit and a priority level for deleting from the storage unit for partial data of the file data saved in the storage unit.

Advantageous Effects of the Invention

According to the vehicle control apparatus above, disconnection of vehicle-to-vehicle communication partway through reception of file data can be addressed by properly saving or deleting partial data saved in a storage unit in accordance with a state of a predetermined parameter so that tightness of the remaining space of memory can be suppressed, and increased efficiency of communication can be promoted.

BRIEF DESCRIPTION OF THE DRAWINGS

FIG. 5 is an explanatory diagram of setting of an upper limit of a period for saving partial data to a memory and a priority level of deletion of the partial data from the memory in accordance with a state of a parameter.

DETAILED DESCRIPTION OF THE PREFERRED EMBODIMENTS

1. Disconnection of Reception of File Data by Vehicle-to-Vehicle Communication

Figure 1:
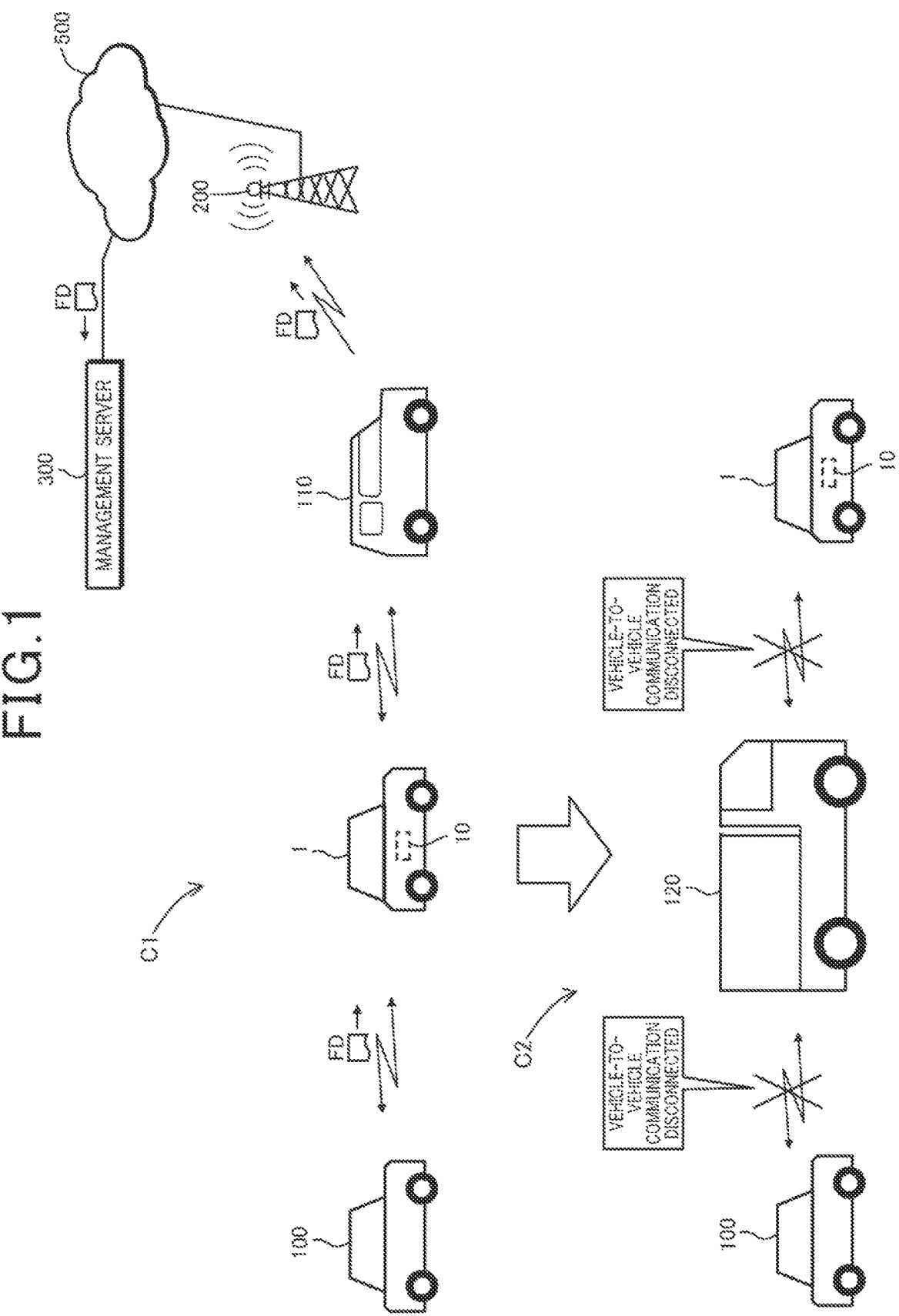
FIG. 1 is an explanatory diagram of a situation where reception of file data by vehicle-to-vehicle communication is disconnected.

With reference to FIG. 1, a situation where reception of file data by vehicle-to-vehicle communication is disconnected is described. FIG. 1 shows C1 indicating a situation where, by vehicle-to-vehicle communication, file data FD transmitted from a vehicle 100 is relayed by a vehicle 1 and a vehicle 110, is received by a base station 200, and is uploaded from the base station 200 of a wide-area wireless network to a management server 300 via a communication network 500.

The vehicle 1 is a control target vehicle in which a vehicle control apparatus 10 of the present invention is mounted, and the vehicle 100 is a communication destination vehicle of the vehicle 1. Hereinafter, the vehicle 1 is called "the vehicle 1", and the vehicle 100 is also called "the other vehicle 100". The vehicle 1 and the other vehicle 100 perform wireless communication based on a communication standard such as dedicated short range communications (DSRC) or Cellular V2X (C-V2X).

In a situation where vehicle-to-vehicle communication is established between the vehicle 1 and the other vehicle 100 and file data FD is transmitted and received as indicated by C1, when a large vehicle 120 comes between the vehicle 1 and the other vehicle 100 as indicated by C2, the vehicle-to-vehicle communication may be disconnected because of the large vehicle 120 being an obstacle. In this case, when the large vehicle 120 changes its direction of running and moves away from between the vehicle 1 and the other vehicle 100, the vehicle-to-vehicle communication between the vehicle 1 and the other vehicle 100 quickly recovers. Therefore, it is efficient that the vehicle 1 saves, in a memory, partial data of the file data FD received up to that point and receives the remaining data of the file data FD from the other vehicle 100 when the vehicle-to-vehicle communication recovers.

On the other hand, in a situation where file data FD is transmitted and received between the vehicle 1 and the other vehicle 100, also when the directions of running of the vehicle 1 and the other vehicle 100 become different in the middle and the vehicle 1 and the other vehicle 100 get away from each other, the vehicle-to-vehicle communication is disconnected, but, in this case, there is a low possibility that the vehicle-to-vehicle communication between the vehicle 1 and the other vehicle 100 will recover. Therefore, it is wasteful to save the partial data of the file data FD received up to that point in the memory as it is, and deleting the data is effective for preventing tightness of the remaining space of the memory.

Accordingly, the vehicle control apparatus 10 mounted in the vehicle 1 executes processing for suppressing tightness of the remaining space of memory and promoting increased efficiency of communication when vehicle-to-vehicle communication is disconnected in a situation where transmission and reception of file data FD is performed by the vehicle-to-vehicle communication between the vehicle 1 and the other vehicle 100. This processing is described below.

2. Configuration of Vehicle Control Apparatus

Figure 2:
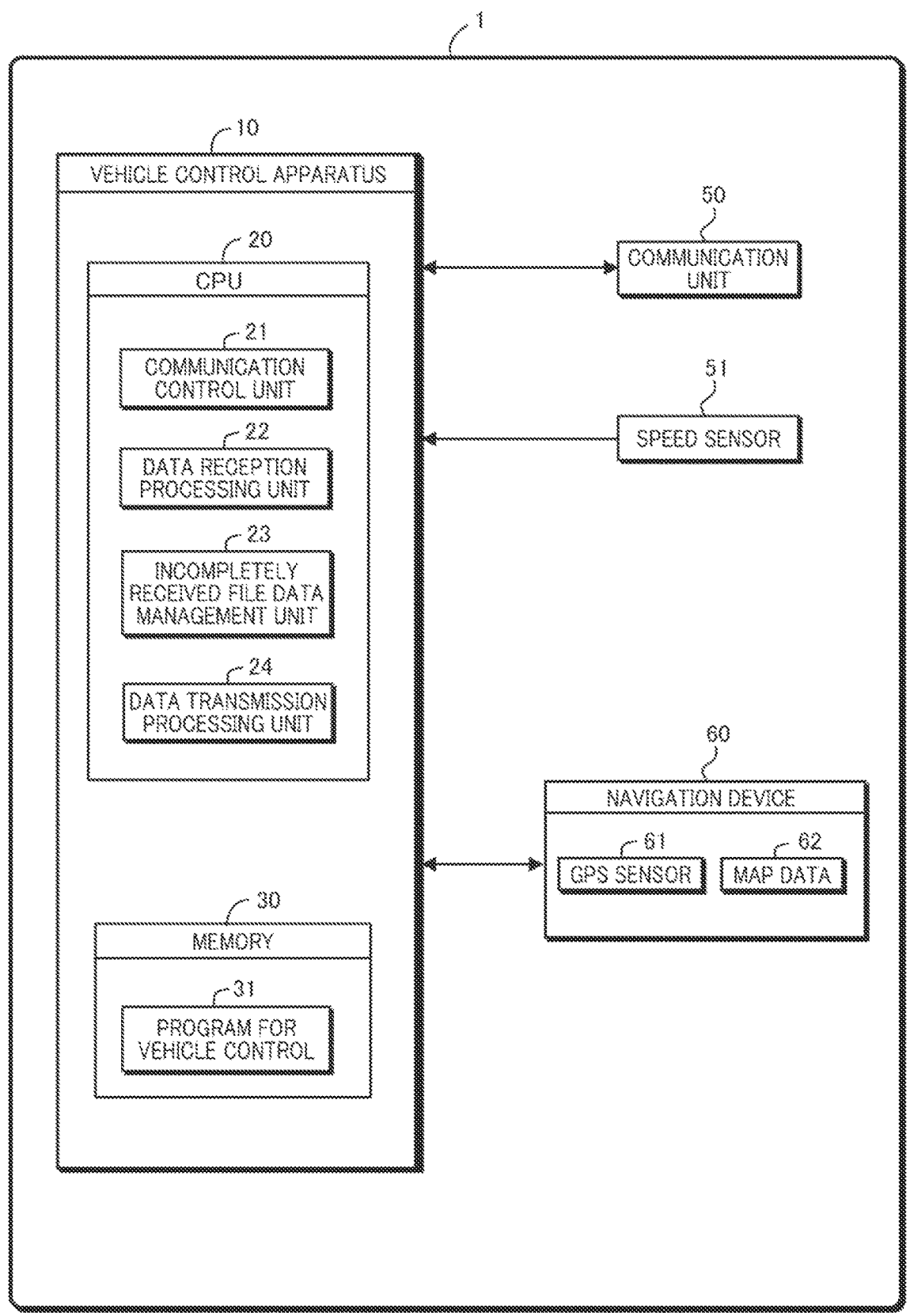
FIG. 2 is a configuration diagram of a vehicle control apparatus.

With reference to FIG. 2, a configuration of the vehicle control apparatus 10 mounted in the vehicle 1 is described. The vehicle 1 includes a communication unit 50, a speed sensor 51, a navigation device 60 and so on in addition to the vehicle control apparatus 10.

The communication unit 50 is a communication interface for performing vehicle-to-vehicle communication with, for example, the other vehicle 100 and wireless communication with the base station 200 of wide-range wireless communication, as shown in FIG. 1, and with, for example, an access point of narrow-range wireless communication, not shown. The speed sensor 51 detects a speed of the vehicle 1 and outputs a speed detection signal to the vehicle control apparatus 10.

The navigation device 60 has a global positioning system (GPS) sensor that detects a current position (latitude and longitude) of the vehicle 1 and map data 62 and executes guidance on a driving path to a destination. The navigation device 60 outputs the current position of the vehicle 1 and information on, for example, the set driving path to the vehicle control apparatus 10.

The vehicle control apparatus 10 includes a central processing unit (CPU) 20, a memory 30 (corresponding to a storage unit) and so on, and a program 31 for vehicle control is saved in the memory 30. The CPU 20 reads and executes the program 31 for vehicle control saved in the memory 30 to function as a communication control unit 21, a data reception processing unit 22, an incompletely received file data management unit 23, and a data transmission processing unit 24. The CPU 20 corresponds to a processor and a computer. The memory 30 corresponds to a recording medium. The program 31 for vehicle control may be recorded in an external computer-readable and writable recording medium (such as a flash memory, a magnetic disk, and an optical disk) and be transferred from the external recording medium to the memory 30. The memory 30 and the external recording medium are non-transitory tangible recording media.

The communication control unit 21 performs vehicle-to-vehicle communication with the other vehicle 100 (see FIG. 1) through the communication unit 50. The data reception processing unit 22 receives file data FD (see FIG. 1) transmitted from the other vehicle 100 by the vehicle-to-vehicle communication executed by the communication control unit 21 and saves it in the memory 30. The incompletely received file data management unit 23 executes processing for addressing a case where vehicle-to-vehicle communication is disconnected while the file data FD is being received from the other vehicle 100 by the vehicle-to-vehicle communication. Details of this processing are described below.

The data transmission processing unit 24 transfers (or hops) the file data FD received from the other vehicle 100 to the other vehicle 110 (see FIG. 1) or uploads it to the base station 200 or an access point or the like through the communication control unit 21 and the communication unit 50.

3. Processing Against Disconnection of Vehicle-to-Vehicle Communication

Figure 3:
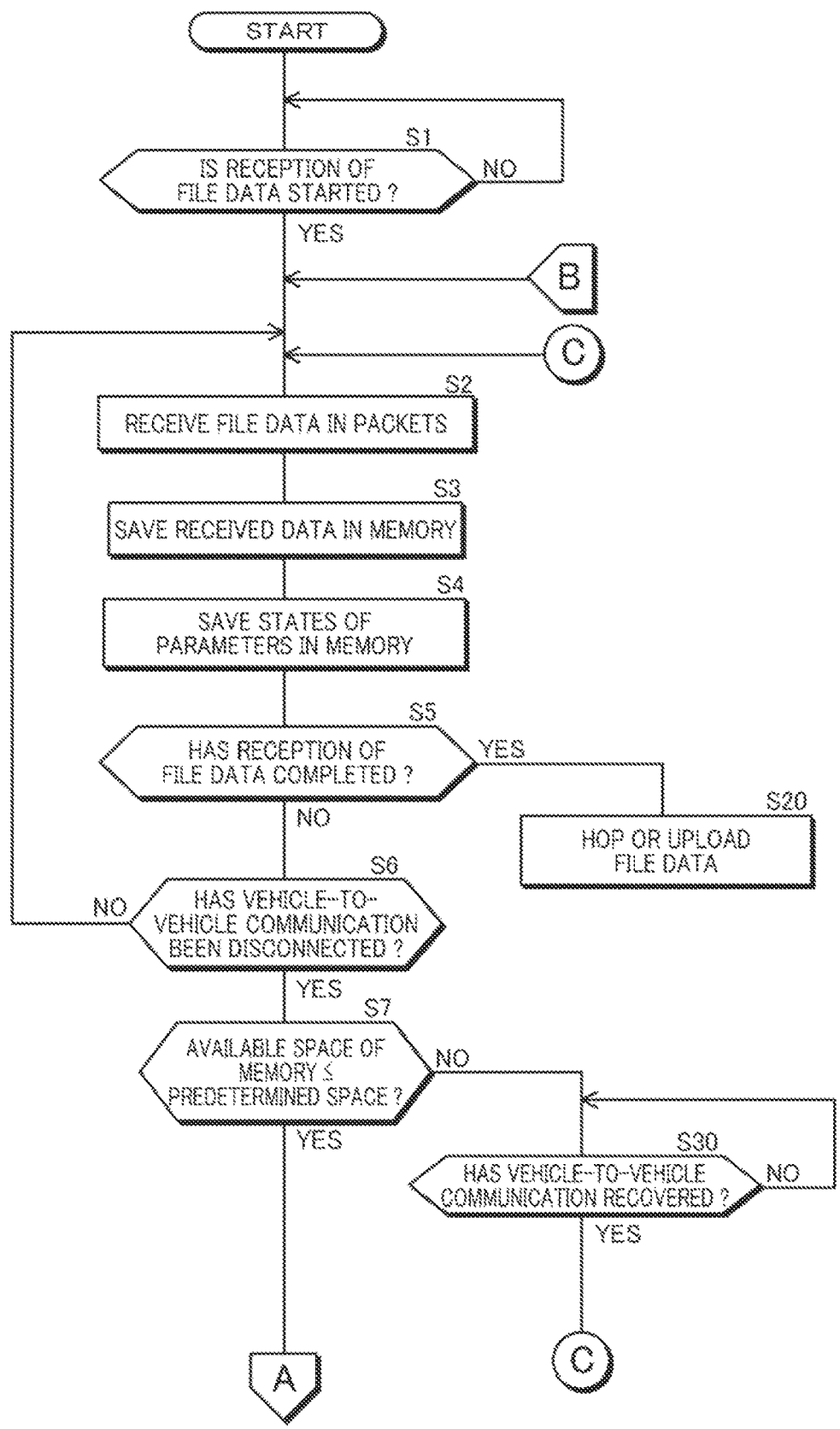
FIG. 3 is a first flowchart of processing against disconnection of vehicle-to-vehicle communication.
Figure 4:
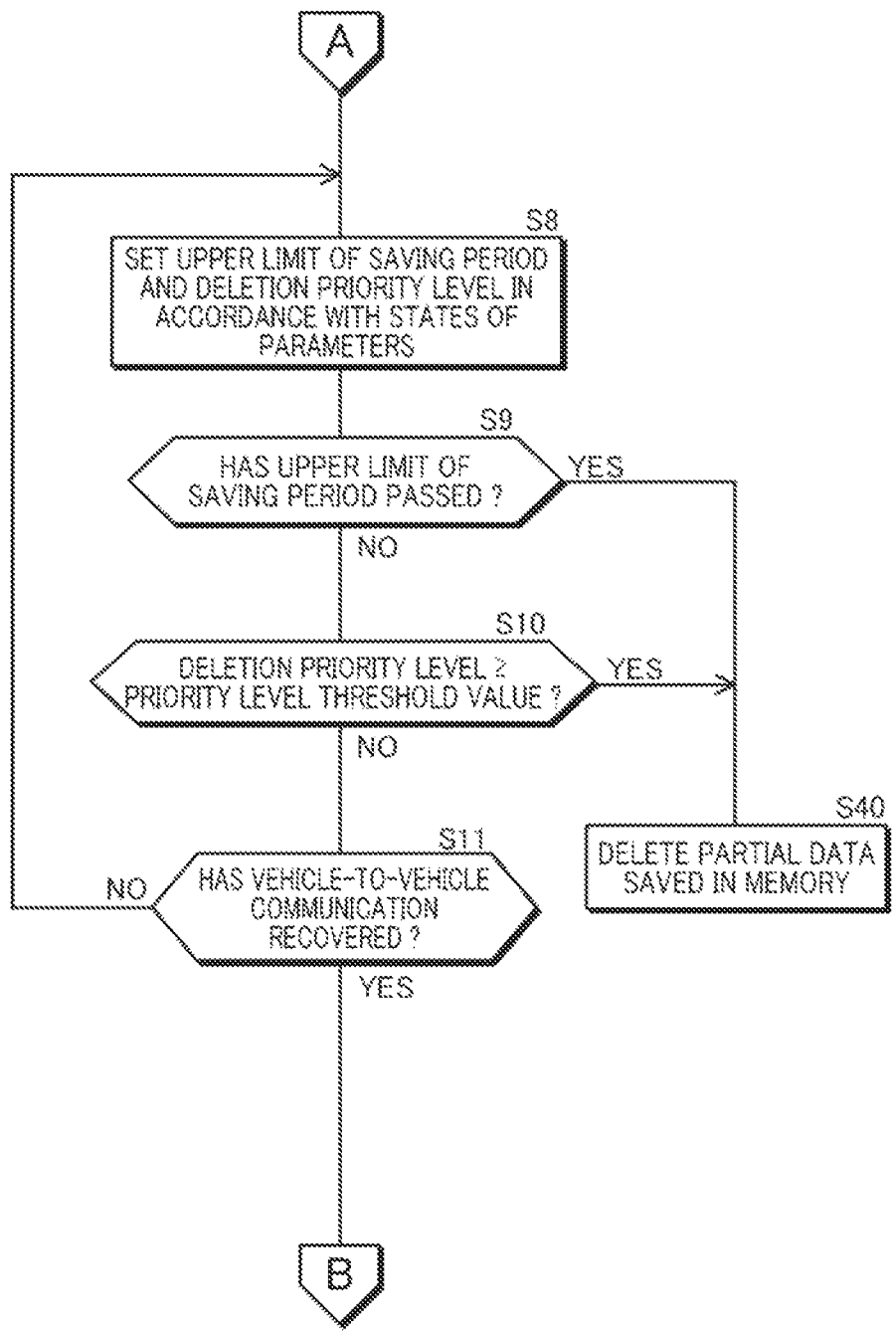
FIG. 4 is a second flowchart of processing against disconnection of vehicle-to-vehicle communication.

With reference to flowcharts shown in FIG. 3 and FIG. 4, processing against disconnection of vehicle-to-vehicle communication to be executed by the vehicle control apparatus 10 in the situation shown in FIG. 1 is described.

If vehicle-to-vehicle communication between the vehicle 1 and the other vehicle 100 is established by the communication control unit 21 and the data reception processing unit 22 starts receiving file data FD transmitted from the other vehicle 100 in step S1 in FIG. 3, the data reception processing unit 22 advances the processing to step S2. The data reception processing unit 22 receives the file data FD in packets through the communication control unit 21 in step S2, and the data reception processing unit 22 saves the received data in the memory 30 in the next step S3.

In the subsequent step S4, the incompletely received file data management unit 23 recognizes and saves in the memory 30 the current states of the following parameters (1-1) to (1-7) shown in FIG. 5.

(1-1) A throughput, a latency, a packet loss rate, and a received signal strength indication (RSSI) (reception intensity) which are parameters relating to a communication environment of vehicle-to-vehicle communication. These parameters relating to a communication environment are calculated by the communication control unit 21;

(1-2) A remaining amount of unreceived data of the file data FD;

(1-3) An available space of the memory 30; (1-4) A vehicle speed of the vehicle 1 or the other vehicle 100. The vehicle speed of the vehicle 1 is recognized based on a speed detection signal output from the speed sensor 51. The vehicle speed of the other vehicle 100 is recognized based on vehicle speed data transmitted from the other vehicle 100 by vehicle-to-vehicle communication;

(1-5) A matching rate of paths of the vehicle 1 and the other vehicle 100. The driving path of the vehicle 1 is recognized based on information on a driving path output from the navigation device 60, and the driving path of the other vehicle 100 is recognized based on information on the driving path of the other vehicle received from the other vehicle 100 by vehicle-to-vehicle communication. The incompletely received file data management unit 23 calculates a path matching rate of the driving path of the vehicle 1 and the driving path of the other vehicle 100;

(1-6) A usage rate of the other vehicle 100. The incompletely received file data management unit 23 recognizes the usage rate of the other vehicle 100 by receiving information on the usage rate of the other vehicle 100 from the other vehicle 100 by vehicle-to-vehicle communication. The usage rate of the other vehicle 100 is, for example, a proportion of a period when the other vehicle 100 is used in a predetermined period (such as one day, one week, or one month). When the information on the usage rate of the other vehicle 100 is uploaded to the management server 300, the incompletely received file data management unit 23 may access the management server 300 and obtain the information on the usage rate of the other vehicle 100; and (1-7) A file data received position, which is the current position where the vehicle 1 receives the file data FD. The incompletely received file data management unit 23 recognizes the received position of the file data FD based on the current position information output from the navigation device 60.

In the next step S5, the data reception processing unit 22 determines whether the reception of the file data FD has completed or not. If the reception of the file data FD has completed, the data reception processing unit 22 advances the processing to step S20, and, if the reception of the file data FD has not completed, the data reception processing unit 22 advances the processing to step S6.

In step S20, the data transmission processing unit 24 transfers to, for example, the other vehicle 110 or uploads to the base station 200 the file data FD saved in the memory 30 and, after the uploading completes, deletes the file data FD from the memory 30. In step S6, the incompletely received file data management unit 23 determines whether the vehicle-to-vehicle communication between the vehicle 1 and the other vehicle 100 has been disconnected or not. The incompletely received file data management unit 23 advances the processing to step S7 if the vehicle-to-vehicle communication has been disconnected and advances the processing to step S2 if the vehicle-to-vehicle communication has not been disconnected.

In step S7, the incompletely received file data management unit 23 determines whether the available space of the memory 30 is equal to or lower than a predetermined space or not. If the available space of the memory 30 is equal to or higher than the predetermined space and if there is an allowance in the available space of the memory 30, the incompletely received file data management unit 23 advances the processing to step S30 and, if the vehicle-to-vehicle communication between the vehicle 1 and the other vehicle 100 has recovered, advances the processing to step S2 where the reception of the file data FD is restarted.

On the other hand, if the available space of the memory 30 is lower than the predetermined space, the incompletely received file data management unit 23 advances the processing to step S8 in FIG. 4. In step S8, the incompletely received file data management unit 23, under conditions shown in FIG. 5, sets an upper limit of the saving period and a deletion priority level of partial data of the file data FD that is received partially and saved in the memory 30 in accordance with a state of a parameter. The upper limit of the saving period is set as, for example, "X minutes to go". The deletion priority level is a priority level to be set with respect to other data saved in the memory 30, and, the higher the deletion priority level is, the earlier the data is deleted from the memory 30.

Referring to FIG. 5, the upper limit of the saving period and the deletion priority level are set for each of the parameters based on the following (2-1) to (2-10).

(2-1) A throughput before disconnection of communication: As the throughput increases, the upper limit of the saving period to be set is increased, and the deletion priority level to be set is decreased. As the throughput decreases, the upper limit of the saving period to be set is decreased, and the deletion priority level to be set is increased.

(2-2) A latency before disconnection of communication: As the latency decreases, the upper limit of the saving period to be set is increased, and the deletion priority level to be set is decreased. As the latency increases, the upper limit of the saving period to be set is decreased, and the deletion priority level to be set is increased.

(2-3) A packet loss rate before disconnection of communication: As the packet loss rate decreases, the upper limit of the saving period to be set is increased, and the deletion priority level to be set is decreased. As the packet loss rate increases, the upper limit of the saving period to be set is decreased, and the deletion priority level to be set is increased.

(2-4) An RSSI before disconnection of communication: As the RSSI increases, the upper limit of the saving period to be set is increased, and the deletion priority level to be set is decreased. As the RSSI decreases, the upper limit of the saving period to be set is decreased, and the deletion priority level to be set is increased.

With the settings of (2-1) to (2-4) above, if the communication environment when the vehicle-to-vehicle communication is disconnected is good, the recovery of the vehicle-to-vehicle communication can be waited, and, if the communication environment when the vehicle-to-vehicle communication is disconnected is not good, the reception of the file data FD can be cancelled immediately, and the received data can be deleted from the memory 30.

(2-5) The remaining amount of unreceived data of the file data: As the remaining amount of data decreases, the upper limit of the saving period to be set is increased, and the deletion priority level to be set is decreased. As the remaining amount of data increases, the upper limit of the saving period to be set is decreased, and the deletion priority level to be set is increased.

With the setting of (2-5), if the remaining amount of data is small, the recovery of the vehicle-to-vehicle communication can be waited, and, if the remaining amount of data is large, the reception of the file data FD can be cancelled immediately, and the received data can be deleted from the memory 30.

(2-6) The vehicle speed of the vehicle or the other vehicle: As the vehicle speed decreases, the upper limit of the saving period to be set is increased, and the deletion priority level to be set is decreased. As the vehicle speed increases, the upper limit of the saving period to be set is decreased, and the deletion priority level to be set is increased.

With the setting of (2-6), if the vehicle speed is low and there is a low possibility that the interval between the vehicle 1 and the other vehicle 100 will increase, the recovery of the vehicle-to-vehicle communication can be waited, and, if the vehicle speed is high and there is a high possibility that the interval between the vehicle 1 and the other vehicle 100 will increase, the reception of the file data FD can be cancelled immediately, and the received data can be deleted from the memory 30.

(2-7) An available space of the memory: As the available space increases, the upper limit of the saving period to be set is increased, and the deletion priority level to be set is decreased. As the available space decreases, the upper limit of the saving period to be set is decreased, and the deletion priority level to be set is increased.

With the setting of (2-7), if there is an allowance in the available space of the memory, the recovery of the vehicle-to-vehicle communication can be waited, and, if there is not an allowance in the available space of the memory, the reception of the file data FD can be cancelled immediately, and the received data can be deleted from the memory 30.

(2-8) A path matching rate: As the path matching rate increases, the upper limit of the saving period to be set is increased, and the deletion priority level to be set is decreased. As the path matching rate decreases, the upper limit of the saving period to be set is decreased, and the deletion priority level to be set is increased.

With the setting of (2-8), if the path matching rate between the vehicle 1 and the other vehicle 100 is high and it is assumed that there is a high possibility that the vehicle 1 and the other vehicle 100 will continue to run side by side, the recovery of the vehicle-to-vehicle communication can be waited. If the path matching rate between the vehicle 1 and the other vehicle 100 is low and it is assumed that there is a high possibility that the vehicle 1 and the other vehicle 100 will move away from each other, the reception of the file data FD can be cancelled immediately, and the received data can be deleted from the memory 30.

(2-9) A usage rate of the other vehicle: As the usage rate of the other vehicle 100 increases, the upper limit of the saving period to be set is increased, and the deletion priority level to be set is decreased. As the usage rate of the other vehicle 100 decreases, the upper limit of the saving period to be set is decreased, and the deletion priority level to be set is increased.

With the setting of (2-9), if the usage rate of the other vehicle 100 is high and it is assumed that there is a high possibility that the other vehicle 100 will continue to run, the recovery of the vehicle-to-vehicle communication can be waited. If the usage rate of the other vehicle 100 is low and it is assumed that there is a high possibility that the other vehicle 100 will stop running, the reception of the file data FD can be cancelled immediately, and the received data can be deleted from the memory 30.

(2-10) A received position by the vehicle 1: If the received position of the file data FD by the vehicle 1 is inside of a living area of a user of the vehicle 1, the upper limit of the saving period to be set is increased, and the deletion priority level to be set is decreased. If the received position of the file data FD by the vehicle 1 is outside of the living area of the user of the vehicle 1, the upper limit of the saving period to be set is decreased, and the deletion priority level to be set is increased.

With the setting of (2-10), if the received position of the file data FD by the vehicle 1 is inside of a living area of a user of the vehicle 1, there is a high possibility that the living area is also the living area of the user of the other vehicle 100 and it is assumed that the vehicle 1 and the other vehicle 100 continue to closely run, the recovery of the vehicle-to-vehicle communication can be waited. If the received position of the file data FD by the vehicle 1 is outside of the living area of the user of the vehicle 1 and there is a low possibility that the vehicle 1 and the other vehicle 100 continue to closely run, the reception of the file data FD can be cancelled immediately, and the received data can be deleted from the memory 30.

In the next step S9, the incompletely received file data management unit 23 determines whether the upper limit of the saving period has passed or not. If the upper limit of the saving period has passed, the incompletely received file data management unit 23 advances the processing to step S40 and, if the upper limit of the saving period has not passed, the incompletely received file data management unit 23 advances the processing to step S10. In step S40, the incompletely received file data management unit 23 deletes the partial data of the file data FD received up to this point and saved in the memory 30 and cancels the reception of the file data FD.

In step S10, the incompletely received file data management unit 23 determines whether the deletion priority level of the partial data of the file data FD saved in the memory 30 is equal to or higher than a priority level threshold value set in accordance with the use condition of the memory 30 or not. If the deletion priority level is equal to or higher than the priority level threshold value, the incompletely received file data management unit 23 advances the processing to step S40 and, if the deletion priority level is lower than the priority level threshold value, the incompletely received file data management unit 23 advances the processing to step S11.

In step S11, the incompletely received file data management unit 23 determines whether the vehicle-to-vehicle communication has recovered or not. If the vehicle-to-vehicle communication has not recovered, the incompletely received file data management unit 23 advances the processing to step S8 and, if the vehicle-to-vehicle communication has recovered, the incompletely received file data management unit 23 advances the processing to step S2 in FIG. 3 and restarts the reception of the file data FD.

4. Other Embodiments

Although, according to the above-described embodiment, the plurality of parameters as shown in FIG. 5 are adopted as parameters to be used for processing for addressing disconnection of vehicle-to-vehicle communication, all of these parameters are not required to be used, but at least any one of them may be used.

For example, the usage rate of the other vehicle and the received position may be used as the parameters, and, if the condition in the following Expression (1) is satisfied, the upper limit of the saving period to be set may be increased, and the deletion priority level to be set may be decreased.

$$M = M_{GEO} + M_{drive} > TH \quad (1)$$

where M: the matching rate between the vehicle 1 and the other vehicle 100, $M_{GEO}$: a parameter of the received position for which a value to be set is increased as the distance between the position where the vehicle 1 has received the file data FD and the center (such as home) of a living area of a user of the vehicle 1 decreases, and $M_{drive}$: a parameter of the usage rate of the other vehicle which is calculated from, for example, a proportion of a period when the other vehicle is used in a predetermined period.

According to the above-described embodiment, in step S7 in FIG. 3, the incompletely received file data management unit 23 determines whether the available space of the memory 30 is equal to or smaller than a predetermined space or not and performs the processing in step S8 in FIG. 4 and subsequent steps limitedly if the available space of the memory 30 is equal to or smaller than the predetermined space. As another embodiment, the processing in step S7 may be omitted, and, irrespective of the available space of the memory 30, the processing in step S8 in FIG. 4 and subsequent steps may be performed.

According to the above-described embodiment, the incompletely received file data management unit 23 uses the throughput, latency, packet loss rate, and RSSI which are index values of a communication environment as the predetermined parameters for setting the upper limit of the saving period and the deletion priority level regarding partial data of the file data FD saved in the memory 30 as shown in FIG. 5. As another embodiment, the incompletely received file data management unit 23 may use, as the predetermined parameter, a change rate of at least one of the throughput, latency, packet loss rate and RSSI.

Here, disconnection of the vehicle-to-vehicle communication as a result of large increases of the change rates above may correspond to a case where the large vehicle 120 comes between the vehicle 1 and the other vehicle 100 and the vehicle-to-vehicle communication between the vehicle 1 and the other vehicle 100 is disconnected as indicated by, for example, C2 in FIG. 1, and, in this case, it is assumed that the disconnection is temporary and there is a high possibility that the vehicle-to-vehicle communication will recover. Accordingly, when these change rates increase and the vehicle-to-vehicle communication is disconnected, the incompletely received file data management unit 23 sets a high upper limit of the saving period and a low deletion priority level for the partial data of the file data FD.

On the other hand, disconnection of the vehicle-to-vehicle communication as a result of small increases of the change rates above may correspond to a case where, from the situation in FIG. 1, the vehicle 1 gradually moves away from the other vehicle 100 and the vehicle-to-vehicle communication is disabled, and, in this case, it is assumed that there is a low possibility that the vehicle-to-vehicle communication will recover. Accordingly, if the vehicle-to-vehicle communication is disconnected in a situation where the change rates of the parameters above are small, the incompletely received file data management unit 23 sets a low upper limit of the saving period and a high deletion priority level for the partial data of the file data FD.

Although FIG. 2 is a schematic diagram showing the configuration of the vehicle control apparatus 10 by dividing it in accordance with the main processing details for easy understanding of the present invention of the subject application, the configuration of the vehicle control apparatus 10 may be based on other divisions. The processing of components therein may be executed by one hardware unit or may be executed by a plurality of hardware units. The processing of the components based on the flowcharts shown in FIG. 3 and FIG. 4 may be executed by one program or may be executed by a plurality of programs.

5. Configurations Supported by the Above-Described Embodiments

The above-described embodiments are specific examples of the following configurations.

(1) A vehicle control apparatus mounted in a control target vehicle, the vehicle control apparatus including a processor executing a communication control process of performing vehicle-to-vehicle communication with a communication destination vehicle other than the control target vehicle, a data reception process of receiving and saving, in a storage unit, file data transmitted from the communication destination vehicle by the vehicle-to-vehicle communication, and an incompletely received file data management process of, in a case where the vehicle-to-vehicle communication is disconnected after the vehicle-to-vehicle communication is established and reception of the file data by the data reception process is started and before the reception of the file data completes, setting, in accordance with a state of a predetermined parameter, at least one of an upper limit of a period for saving in the storage unit and a priority level for deleting from the storage unit for partial data of the file data saved in the storage unit.

According to the vehicle control apparatus of (1), disconnection of vehicle-to-vehicle communication partway through reception of file data can be addressed by properly saving or deleting partial data saved in the storage unit in accordance with a state of a predetermined parameter so that tightness of the remaining space of memory can be suppressed, and increased efficiency of communication can be promoted.

(2) The vehicle control apparatus according to (1), wherein, in the incompletely received file data management process, the processor uses, as the predetermined parameter, at least one of a throughput, received signal strength indication (RSSI), latency, and packet loss rate when the vehicle-to-vehicle communication is established, a remaining amount of unreceived data of the file data, a speed of the control target vehicle, an available space of the storage unit, matching information of driving paths of the control target vehicle and the communication destination vehicle, a usage rate of the communication destination vehicle, and a current position of the control target vehicle.

According to the vehicle control apparatus of (2), an upper limit of a period for saving the partial data of the file data in the storage unit and a priority level for deleting the partial data of the file data from the storage unit can be set in accordance with a communication environment of the vehicle-to-vehicle communication, a state of the control target vehicle, or a driving state of the communication destination vehicle.

(3) The vehicle control apparatus according to (1) or (2), wherein, in the incompletely received file data management process, the processor uses, as the predetermined parameter, a change rate of at least one of the throughput, RSSI, latency and packet loss rate when the vehicle-to-vehicle communication is established.

According to the vehicle control apparatus of (3), an upper limit of a period for saving the partial data of the file data in the storage unit and a priority level for deleting the partial data of the file data from the storage unit can be set in accordance with a change in the communication environment of the vehicle-to-vehicle communication.

(4) The vehicle control apparatus according to any one of (1) to (3), wherein, in the incompletely received file data management process, the processor sets at least one of the upper limit of the period for saving in the storage unit and the priority level for deleting from the storage unit if the storage unit has an available space equal to or lower than a predetermined space.

According to the vehicle control apparatus of (4), the processing for addressing the disconnection of the vehicle-to-vehicle communication by the incompletely received file data management unit is executed limitedly if there is not an allowance in the available space of the storage unit so that a computing load in the vehicle control apparatus can be reduced.

(5) A vehicle including the vehicle control apparatus according to any one of (1) to (4).

According to the vehicle of (5), disconnection of vehicle-to-vehicle communication partway through reception of file data can be addressed by properly saving or deleting partial data saved in the storage unit in accordance with a state of a predetermined parameter so that tightness of the remaining space of memory can be suppressed, and increased efficiency of communication can be promoted.

(6) A non-transitory recording medium recording a program for vehicle control causing a processor mounted in a control target vehicle to execute a communication control process of performing vehicle-to-vehicle communication with a communication destination vehicle other than the control target vehicle, a data reception process of receiving and saving, in a storage unit, file data transmitted from the communication destination vehicle by the vehicle-to-vehicle communication, and an incompletely received file data management process of, in a case where the vehicle-to-vehicle communication is disconnected after the vehicle-to-vehicle communication is established and reception of the file data by the data reception process is started and before the reception of the file data completes, setting, in accordance with a state of a predetermined parameter, at least one of an upper limit of a period for saving in the storage unit and a priority level for deleting from the storage unit for partial data of the file data saved in the storage unit.

By executing the program for vehicle control of (6) by the processor mounted in the control target vehicle, the configuration of the vehicle control apparatus of (1) can be implemented.

(7) A vehicle control method to be executed by a computer for controlling a control target vehicle, the computer performing vehicle-to-vehicle communication with a communication destination vehicle other than the control target vehicle, receiving and saving, in a storage unit, file data transmitted from the communication destination vehicle by the vehicle-to-vehicle communication, and, in a case where the vehicle-to-vehicle communication is disconnected after the vehicle-to-vehicle communication is established and reception of the file data transmitted from the communication destination vehicle is started and before the reception of the file data completes, setting, in accordance with a state of a predetermined parameter, at least one of an upper limit of a period for saving in the storage unit and a priority level for deleting from the storage unit for partial data of the file data saved in the storage unit.

By executing the vehicle control method of (7) by a computer, the same operational effects as those of the vehicle control apparatus of (1) can be acquired.

REFERENCE SIGNS LIST

1: control target vehicle (the vehicle), 10: vehicle control apparatus, 20: CPU, 21: communication control unit, 22: data reception processing unit, 23: incompletely received file data management unit, 24: data transmission processing unit, 30: memory, 31: program for vehicle control, 50: communication unit, 51: speed sensor, 60: navigation device, 100: communication destination vehicle (the other vehicle), 200: base station, 300: management server

What is claimed is:
1. A vehicle control apparatus mounted in a control target vehicle, the vehicle control apparatus comprising a processor executing:

a communication control process of performing vehicle-to-vehicle communication with a communication destination vehicle other than the control target vehicle;

a data reception process of receiving and saving, in a memory, file data transmitted from the communication destination vehicle by the vehicle-to-vehicle communication; and an incompletely received file data management process of, in a case where the vehicle-to-vehicle communication is disconnected after the vehicle-to-vehicle communication is established and reception of the file data by the data reception process is started and before the reception of the file data completes, setting, in accordance with a state of a predetermined parameter, an upper limit of a period for saving in the memory and a deletion priority level for deleting from the memory for partial data of the file data saved in the memory, wherein the processor sets the upper limit of a period for saving and the deletion priority level for deleting based on at least one of the following parameters:

a throughput before disconnection of communication wherein as the throughput increases, the upper limit of the saving period to be set is increased and the deletion priority level to be set is decreased, and wherein as the throughput decreases, the upper limit of the saving period to be set is decreased and the deletion priority level to be set is increased;

a latency before disconnection of communication wherein as the latency decreases, the upper limit of the saving period to be set is increased and the deletion priority level to be set is decreased, and wherein as the latency increases, the upper limit of the saving period to be set is decreased and the deletion priority level to be set is increased;

a packet loss rate before disconnection of communication wherein as the packet loss rate decreases, the upper limit of the saving period to be set is increased and the deletion priority level to be set is decreased, and wherein as the packet loss rate increases, the upper limit of the saving period to be set is decreased and the deletion priority level to be set is increased;

a received signal strength indication (RSSI) before disconnection of communication wherein as the RSSI increases, the upper limit of the saving period to be set is increased and the deletion priority level to be set is decreased, and wherein as the RSSI decreases, the upper limit of the saving period to be set is decreased and the deletion priority level to be set is increased;

a remaining amount of unreceived data of the file data wherein as the remaining amount of unreceived data decreases, the upper limit of the saving period to be set is increased and the deletion priority level to be set is decreased, and wherein as the remaining amount of unreceived data increases, the upper limit of the saving period to be set is decreased and the deletion priority level to be set is increased;

a vehicle speed of the control target vehicle or the communication destination vehicle wherein as the vehicle speed decreases, the upper limit of the saving period to be set is increased and the deletion priority level to be set is decreased, and wherein as the vehicle speed increases, the upper limit of the saving period to be set is decreased and the deletion priority level to be set is increased;

a path matching rate wherein as the path matching rate increases, the upper limit of the saving period to be set is increased and the deletion priority level to be set is decreased, and wherein as the path matching rate decreases, the upper limit of the saving period to be set is decreased and the deletion priority level to be set is increased;

a usage rate of the communication destination vehicle wherein as the usage rate of the communication destination vehicle increases, the upper limit of the saving period to be set is increased and the deletion priority level to be set is decreased, and wherein as the usage rate of the communication destination vehicle decreases, the upper limit of the saving period to be set is decreased and the deletion priority level to be set is increased; and a received position by the control target vehicle wherein if the received position of the file data by the control target vehicle is inside of a living area of a user of the control target vehicle, the upper limit of the saving period to be set is increased and the deletion priority level to be set is decreased, and wherein if the received position of the file data by the control target vehicle is outside of the living area of the user of the control target vehicle, the upper limit of the saving period to be set is decreased and the deletion priority level to be set is increased.

2. A vehicle comprising the vehicle control apparatus according to claim 1.

3. A non-transitory recording medium recording a program for vehicle control causing a processor mounted in a control target vehicle to execute:

a communication control process of performing vehicle-to-vehicle communication with a communication destination vehicle other than the control target vehicle;

a data reception process of receiving and saving, in a memory, file data transmitted from the communication destination vehicle by the vehicle-to-vehicle communication; and an incompletely received file data management process of, in a case where the vehicle-to-vehicle communication is disconnected after the vehicle-to-vehicle communication is established and reception of the file data by the data reception process is started and before the reception of the file data completes, setting, in accordance with a state of a predetermined parameter, an upper limit of a period for saving in the memory and a deletion priority level for deleting from the memory for partial data of the file data saved in the memory, wherein the processor sets the upper limit of a period for saving and the deletion priority level for deleting based on at least one of the following parameters:

a throughput before disconnection of communication wherein as the throughput increases, the upper limit of the saving period to be set is increased and the deletion priority level to be set is decreased, and wherein as the throughput decreases, the upper limit of the saving period to be set is decreased and the deletion priority level to be set is increased;

a latency before disconnection of communication wherein as the latency decreases, the upper limit of the saving period to be set is increased and the deletion priority level to be set is decreased, and wherein as the latency increases, the upper limit of the saving period to be set is decreased and the deletion priority level to be set is increased;

a packet loss rate before disconnection of communication wherein as the packet loss rate decreases, the upper limit of the saving period to be set is increased and the deletion priority level to be set is decreased, and wherein as the packet loss rate increases, the upper limit of the saving period to be set is decreased and the deletion priority level to be set is increased;

a received signal strength indication (RSSI) before disconnection of communication wherein as the RSSI increases, the upper limit of the saving period to be set is increased and the deletion priority level to be set is decreased, and wherein as the RSSI decreases, the upper limit of the saving period to be set is decreased and the deletion priority level to be set is increased;

a remaining amount of unreceived data of the file data wherein as the remaining amount of unreceived data decreases, the upper limit of the saving period to be set is increased and the deletion priority level to be set is decreased, and wherein as the remaining amount of unreceived data increases, the upper limit of the saving period to be set is decreased and the deletion priority level to be set is increased;

a vehicle speed of the control target vehicle or the communication destination vehicle wherein as the vehicle speed decreases, the upper limit of the saving period to be set is increased and the deletion priority level to be set is decreased, and wherein as the vehicle speed increases, the upper limit of the saving period to be set is decreased and the deletion priority level to be set is increased;

a path matching rate wherein as the path matching rate increases, the upper limit of the saving period to be set is increased and the deletion priority level to be set is decreased, and wherein as the path matching rate decreases, the upper limit of the saving period to be set is decreased and the deletion priority level to be set is increased;

a usage rate of the communication destination vehicle wherein as the usage rate of the communication destination vehicle increases, the upper limit of the saving period to be set is increased and the deletion priority level to be set is decreased, and wherein as the usage rate of the communication destination vehicle decreases, the upper limit of the saving period to be set is decreased and the deletion priority level to be set is increased; and a received position by the control target vehicle wherein if the received position of the file data by the control target vehicle is inside of a living area of a user of the control target vehicle, the upper limit of the saving period to be set is increased and the deletion priority level to be set is decreased, and wherein if the received position of the file data by the control target vehicle is outside of the living area of the user of the control target vehicle, the upper limit of the saving period to be set is decreased and the deletion priority level to be set is increased.

4. A vehicle control method to be executed by a computer for controlling a control target vehicle, the computer:

performing vehicle-to-vehicle communication with a communication destination vehicle other than the control target vehicle;

receiving and saving, in a memory, file data transmitted from the communication destination vehicle by the vehicle-to-vehicle communication;

in a case where the vehicle-to-vehicle communication is disconnected after the vehicle-to-vehicle communication is established and reception of the file data transmitted from the communication destination vehicle is started and before the reception of the file data completes, setting, in accordance with a state of a predetermined parameter, an upper limit of a period for saving in the memory and a deletion priority level for deleting from the memory for partial data of the file data saved in the memory setting the upper limit of a period for saving and the deletion priority level for deleting based on at least one of the following parameters:

a throughput before disconnection of communication wherein as the throughput increases, the upper limit of the saving period to be set is increased and the deletion priority level to be set is decreased, and wherein as the throughput decreases, the upper limit of the saving period to be set is decreased and the deletion priority level to be set is increased;

a latency before disconnection of communication wherein as the latency decreases, the upper limit of the saving period to be set is increased and the deletion priority level to be set is decreased, and wherein as the latency increases, the upper limit of the saving period to be set is decreased and the deletion priority level to be set is increased;

a packet loss rate before disconnection of communication wherein as the packet loss rate decreases, the upper limit of the saving period to be set is increased and the deletion priority level to be set is decreased, and wherein as the packet loss rate increases, the upper limit of the saving period to be set is decreased and the deletion priority level to be set is increased;

a received signal strength indication (RSSI) before disconnection of communication wherein as the RSSI increases, the upper limit of the saving period to be set is increased and the deletion priority level to be set is decreased, and wherein as the RSSI decreases, the upper limit of the saving period to be set is decreased and the deletion priority level to be set is increased;

a remaining amount of unreceived data of the file data wherein as the remaining amount of unreceived data decreases, the upper limit of the saving period to be set is increased and the deletion priority level to be set is decreased, and wherein as the remaining amount of unreceived data increases, the upper limit of the saving period to be set is decreased and the deletion priority level to be set is increased;

a vehicle speed of the control target vehicle or the communication destination vehicle wherein as the vehicle speed decreases, the upper limit of the saving period to be set is increased and the deletion priority level to be set is decreased, and wherein as the vehicle speed increases, the upper limit of the saving period to be set is decreased and the deletion priority level to be set is increased;

a path matching rate wherein as the path matching rate increases, the upper limit of the saving period to be set is increased and the deletion priority level to be set is decreased, and wherein as the path matching rate decreases, the upper limit of the saving period to be set is decreased and the deletion priority level to be set is increased;

a usage rate of the communication destination vehicle wherein as the usage rate of the communication destination vehicle increases, the upper limit of the saving period to be set is increased and the deletion priority level to be set is decreased, and wherein as the usage rate of the communication destination vehicle decreases, the upper limit of the saving period to be set is decreased and the deletion priority level to be set is increased; and a received position by the control target vehicle wherein if the received position of the file data by the control target vehicle is inside of a living area of a user of the control target vehicle, the upper limit of the saving period to be set is increased and the deletion priority level to be set is decreased, and wherein if the received position of the file data by the control target vehicle is outside of the living area of the user of the control target vehicle, the upper limit of the saving period to be set is decreased and the deletion priority level to be set is increased.

* * * * *